(12) United States Patent
Welsh (10) Patent No.: US 7,648,338 B1
(45) Date of Patent: Jan. 19, 2010

(54) DUAL HIGHER HARMONIC CONTROL (HHC) FOR A COUNTER-ROTATING, COAXIAL ROTOR SYSTEM

(75) Inventor: William A. Welsh, North Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 490 days.

(21) Appl. No.: 11/521,032

(22) Filed: Sep. 14, 2006

(51) Int. Cl.
*B64C 27/00* (2006.01)

(52) U.S. Cl. ............................... 416/1; 416/33; 416/61; 416/163

(58) Field of Classification Search .................. 416/1, 416/33, 44, 61, 155, 163
See application file for complete search history.

(56) References Cited

U.S. PATENT DOCUMENTS

| | | | |
|---|---|---|---|
| 4,008,979 A * | 2/1977 | Cooper et al. ............... | 416/40 |
| 4,953,098 A | 8/1990 | Fischer, Jr. et al. | |
| 4,965,879 A | 10/1990 | Fischer, Jr. | |
| 4,980,835 A | 12/1990 | Lawrence et al. | |
| 5,314,308 A | 5/1994 | Reed, III | |
| 5,502,650 A | 3/1996 | Naruse et al. | |
| 6,671,590 B1 | 12/2003 | Betzina et al. | |
| 7,083,142 B2 * | 8/2006 | Scott ....................... | 244/17.13 |
| 7,210,651 B2 * | 5/2007 | Scott ....................... | 244/17.13 |
| 2004/0050999 A1 * | 3/2004 | Hill et al. ................. | 244/17.27 |
| 2005/0067527 A1 * | 3/2005 | Petersen .................. | 244/17.11 |
| 2005/0236518 A1 * | 10/2005 | Scott ....................... | 244/17.23 |

OTHER PUBLICATIONS

"Design of Higher Harmonic Control for the ABC;" J. O'Leary and W. Miao, pp. 52-57, Jan. 1982, Journal of the American Helicopter Society.
PCT International Search Report, mailed Apr. 10, 2008.

* cited by examiner

*Primary Examiner*—Edward Look
*Assistant Examiner*—Aaron R Eastman
(74) *Attorney, Agent, or Firm*—Carlson, Gaskey & Olds PC (57) ABSTRACT

A dual, counter-rotating, coaxial rotor system provides individual control of an upper rotor system and a lower rotor system. The lower rotor control system and the upper rotor control system provide six controls or "knobs" to minimize or theoretically eliminate airframe vibration. In a dual, counter-rotating, coaxial rotor system, application of a HHC system to the two rotor systems individually but located on the common axis, will yield essentially complete vibration reduction because the 6 controls will suppress the 6 loads.

10 Claims, 6 Drawing Sheets

$$F_{net} = T * U + F_{ambient}$$

$$\begin{Bmatrix} \delta F_1 \\ \delta F_2 \\ \delta F_3 \\ \delta M_1 \\ \delta M_2 \\ \delta M_3 \end{Bmatrix} = \begin{bmatrix} \delta F_1/\delta u_1 & \delta F_1/\delta u_2 & \delta F_1/\delta u_3 & \delta F_1/\delta u_4 & \delta F_1/\delta u_5 & \delta F_1/\delta u_6 \\ \delta F_2/\delta u_1 & \delta F_2/\delta u_2 & \delta F_2/\delta u_3 & \delta F_2/\delta u_4 & \delta F_2/\delta u_5 & \delta F_2/\delta u_6 \\ \delta F_3/\delta u_1 & \delta F_3/\delta u_2 & \delta F_3/\delta u_3 & \delta F_3/\delta u_4 & \delta F_3/\delta u_5 & \delta F_3/\delta u_6 \\ \delta M_1/\delta u_1 & \delta M_1/\delta u_2 & \delta M_1/\delta u_3 & \delta M_1/\delta u_4 & \delta M_1/\delta u_5 & \delta M_1/\delta u_6 \\ \delta M_2/\delta u_1 & \delta M_2/\delta u_2 & \delta M_2/\delta u_3 & \delta M_2/\delta u_4 & \delta M_2/\delta u_5 & \delta M_2/\delta u_6 \\ \delta M_3/\delta u_1 & \delta M_3/\delta u_2 & \delta M_3/\delta u_3 & \delta M_3/\delta u_4 & \delta M_3/\delta u_5 & \delta M_3/\delta u_6 \end{bmatrix} \begin{Bmatrix} \delta u_1 \\ \delta u_2 \\ \delta u_3 \\ \delta u_4 \\ \delta u_5 \\ \delta u_6 \end{Bmatrix}$$

6x1     6x6     6x1

SIX HUB LOAD CHANGES THAT ACT ON THE FUSELAGE

MATRIX OF SENSITIVITIES THE DEFINE HOW THE HUB LOADS CHANGE WITH EACH CONTROL INPUT

SIX INDEPENDENT SWASHPLATE CONTROL CHANGE "KNOBS"

ABOVE EQUATION CAN BE SOLVED *EXACTLY* TO DETERMINE U TO NULLIFY $F_{amb}$ IF T IS "SQUARE" I.E. THE NUMBER OF INDEPENDENT ROWS OF T IS EQUAL TO THE NUMBER OF INDEPENDENT COLUMNS.

IF:    $F_{net} = 0$

THEN:    $U = T^{-1} * F_{ambient}$

DUAL HIGHER HARMONIC CONTROL (HHC) FOR A COUNTER-ROTATING, COAXIAL ROTOR SYSTEM

BACKGROUND OF THE INVENTION

The present invention relates to a rotary-wing aircraft, and more particularly to a HHC vibration control system therefor.

The reduction of vibrations is a primary goal in rotary-wing aircraft design. Such vibrations may contribute to crew fatigue, increased maintenance, and operating costs. A major cause of such vibrations is periodic aerodynamic loads on the rotor blades.

An effective method of reducing rotor-blade induced vibrations is to control the harmonic airload at the source, i.e. on the rotor blades. For an N-bladed rotor, harmonic loads at a frequency rate of (N−1) per revolution, N per revolution and (N+1) per revolution are transmitted to the rotor hub. All three harmonic load frequencies in the rotating rotor frame of reference result in fuselage vibration in the non-rotating frame of reference at the frequency rate of N/revolution (hereinafter NP). The function of HHC devices is to generate additional airloads on the rotor so as to cancel the NP vibratory hub load in the non-rotating frame of reference.

Various schemes for reducing helicopter vibrations by HHC have been investigated. Some approaches are based on passive vibration control concepts involving dynamically tuned mechanisms which actuate either the swash plate or the tab surfaces on the rotor blade. Other HHC concepts make use of high frequency active control systems which, when coupled with vibration sensors, provide vibration reduction by either manual control or closed loop feedback control.

Reducing rotor-blade induced vibrations in a dual, counter-rotating, coaxial rotor system is further complicated as control inputs to the upper rotor control system and lower rotor control system are typically linked or slaved. As such, HHC systems have heretofore been linked or slaved such that the HHC inputs to the upper rotor system are a fixed multiple of the inputs to the lower rotor system. Such linkage may be acceptable to minimize vibrations to a certain extent but will not provide the more significant vibration reduction levels demanded by current rotary-wing aircraft operators.

1980 AHS (American Helicopter Society) paper entitled "Design of Higher Harmonic Control for the ABC", J. O'Leary and W. Miao, publicly describe the originally HHC proposed system. The system does control six "signal" actuators to provide HHC inputs to the main servos i.e. three inputs to the signal actuators inputting into main servo of the upper rotor and three inputs to the signal actuators inputting into the main servos of the lower rotor. In this case, however, the three inputs to the upper signal actuators are fixed multiples of the three inputs to the lower signal actuators such that the upper rotor signal inputs are "slaved" to the lower rotor inputs. The pilot flight controls for the upper and lower rotors were also slaved together. Thus, following this slaving philosophy for the HHC inputs was a natural approach. It is apparent in this AHS paper that the analyses projected imperfect vibration control. This is because the slaving process only produces a total of three unique controls whereas there are up to six vibratory hub loads that require suppression for excellent vibration reduction.

Accordingly, it is desirable to provide an HHC system which essentially provides total suppression of vibration heretofore unachieved in a dual, counter-rotating, coaxial rotor system.

SUMMARY OF THE INVENTION

The HHC system according to the present invention generally includes an HHC controller, a sensor system in communication with the HHC controller and an upper HHC actuator system and a lower HHC actuator system which implements individual higher harmonic blade pitch to the upper rotor system and the lower rotor system. The upper HHC actuator system and the lower HHC actuator system each include a fore-aft cyclic actuator, a left-right cyclic actuator, and a collective actuator (x-y-z axes).

A dual, counter-rotating, coaxial rotor control system provides individual control of the upper rotor system and the lower rotor system. The lower rotor control system and the upper rotor control system provide six controls or "knobs" to minimize or theoretically eliminate airframe vibration. The current invention is based upon the key realization that the two rotors enable a total of six independent HHC controls which is equal to the number of vibratory hub loads created by two co-axial rotors in forward flight. For a vehicle equipped with co-axial rotors, the vibration from the two rotors combine to produce only six vibratory hub loads at the point where the rotor support shaft attaches to the aircraft. Thus, applying HHC to the two rotors can yield six independent controls to completely suppress six hub loads.

The present invention therefore provides a HHC system which essentially provides total suppression of vibration heretofore unachieved in a dual, counter-rotating, coaxial rotor system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
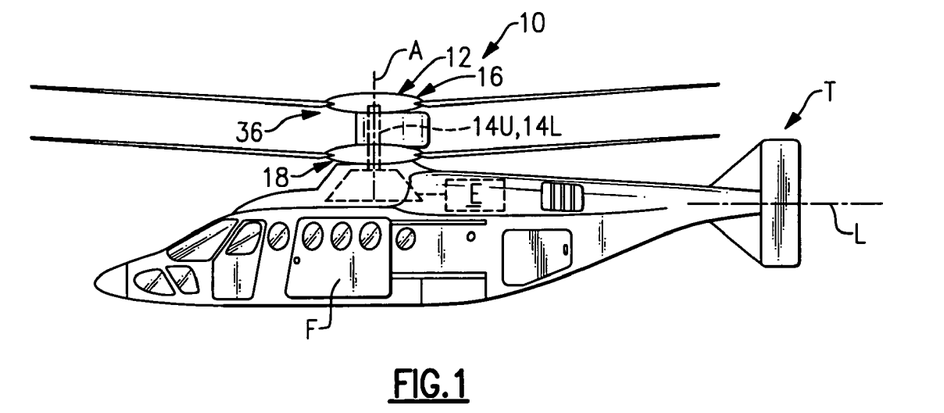
FIG. 1 is a general perspective side view of an exemplary rotary-wing aircraft embodiment for use with the present invention.

FIGS. 1 illustrates an exemplary vertical takeoff and landing (VTOL) rotary-wing aircraft 10 having a dual, counter-rotating, coaxial rotor system 12 which rotates about a rotating main rotor shaft 14U, and a counter-rotating main rotor shaft 14L (FIG. 2) both about an axis of rotation A. The aircraft 10 includes an airframe F which supports the dual, counter rotating, coaxial rotor system 12 as well as an optional translational thrust system T which provides translational thrust during high speed forward flight generally parallel to an aircraft longitudinal axis L. Although a particular aircraft configuration is illustrated in the disclosed embodiment, other counter-rotating, coaxial rotor systems will also benefit from the present invention. Although a particular counter-rotating, coaxial rotor system aircraft configuration is illustrated in the disclosed embodiment, other rotor systems and other aircraft types such as tilt-wing and tilt-rotor aircraft will also benefit from the present invention.

A main gearbox G which may be located above the aircraft cabin drives the rotor system 12. The translational thrust system T may be driven by the same main gearbox G which drives the rotor system 12. The main gearbox G is driven by one or more engines (illustrated schematically at E). As shown, the main gearbox G may be interposed between the gas turbine engines E, the rotor system 12 and the translational thrust system T.

Figure 2:
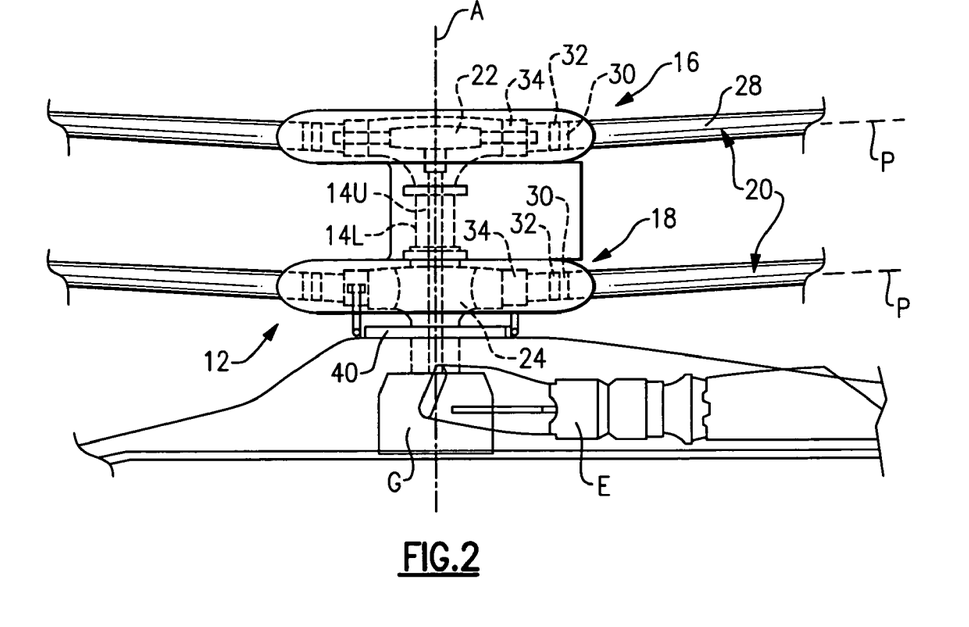
FIG. 2 is an expanded partial phantom view of a dual, counter-rotating, coaxial rotor system of the aircraft of FIG. 1.

Referring to FIG. 2, the dual, counter-rotating, coaxial rotor system 12 includes an upper rotor system 16 and a lower rotor system 18. Each rotor system 16, 18 includes a plurality of rotor blade assemblies 20 mounted to a rotor hub assembly 22, 24 for rotation about the rotor axis of rotation A. The rotor hub assembly 22 is mounted to the upper rotor shaft 14U which counter rotates within the lower rotor shaft 14L which rotates the lower hub assembly 24.

The plurality of the main rotor blade assemblies 20 project substantially radially outward from the hub assemblies 22, 24. Any number of main rotor blade assemblies 20 may be used with the rotor system 12. Each rotor blade assembly 20 of the rotor system 12 generally includes a rotor blade 28 (illustrated somewhat schematically), a rotor blade spindle 30, and a rotor blade bearing 32 which supports the rotor blade spindle 30 within a bearing housing 34 to permit the rotor blade 28 to pitch about a pitching axis P. It should be understood that various blade attachments may also be utilized with the present invention.

Figure 3:
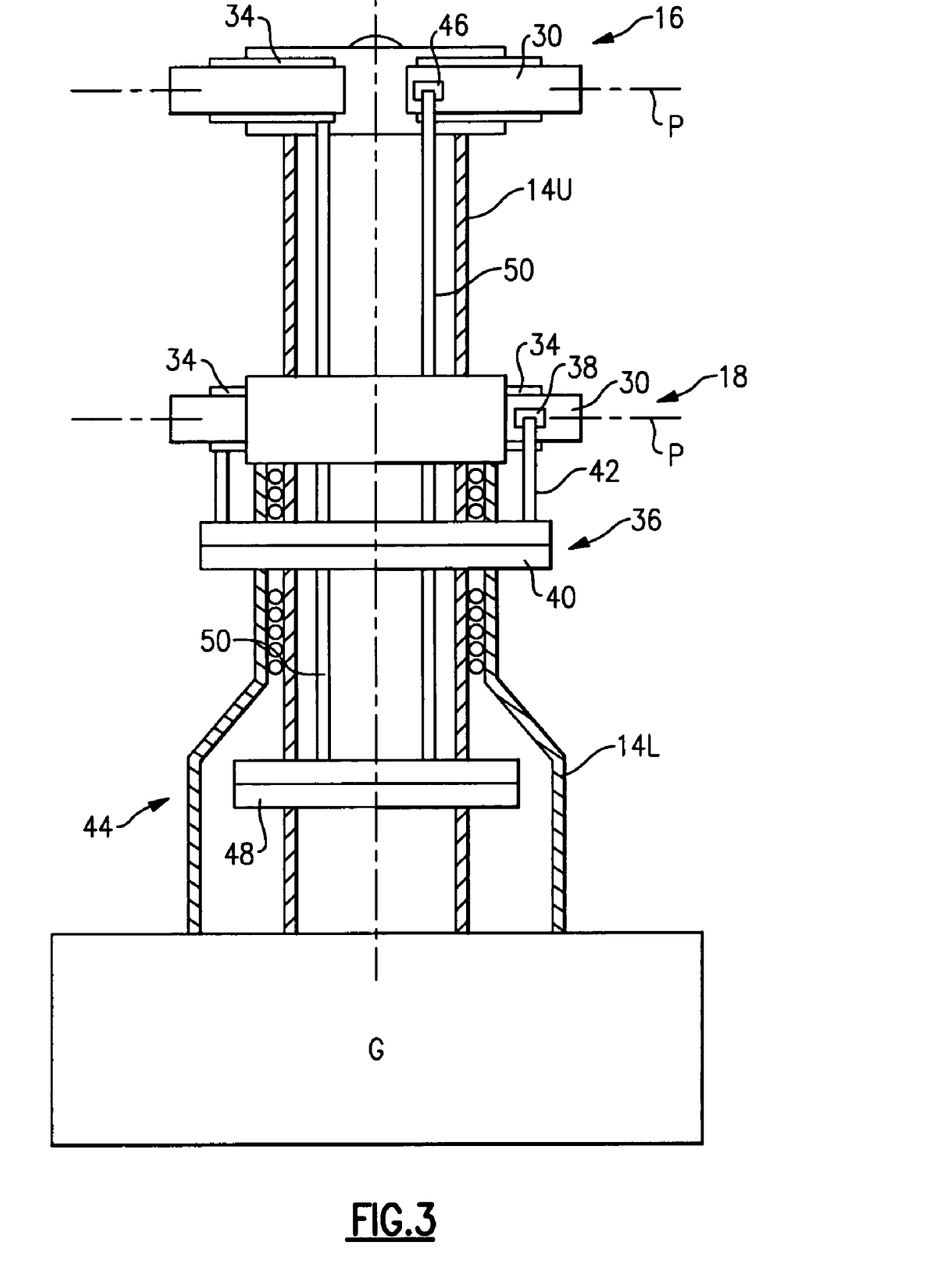
FIG. 3 is a schematic longitudinal sectional view of a dual, counter-rotating, coaxial rotor control system in a flight position.

Referring to FIG. 3, a lower rotor control system 36 includes a rotor blade pitch control horn 38 mounted for rotation with the rotor blade spindle 30 of each lower rotor blade 28. Each rotor blade pitch control horn 38 is linked to a lower swashplate 40 through a pitch control rod and servo mechanism 42 to impart the desired pitch control thereto. An upper rotor control system 44 includes a rotor blade pitch control horn 46 mounted for rotation with the rotor blade spindle 30 of each upper rotor blade 28. Each rotor blade pitch control horn 46 is linked to an upper swashplate 48 through a pitch control rod and servo mechanism 50 to impart the desired pitch control thereto.

Each rotor system 36, 44 is independently controlled through the separate swashplate assemblies 40, 48 which selectively articulates each rotor system 36, 44. Generally, motion of the swashplate assemblies 40, 48 along the rotor axis A will cause the rotor blades 20 of the respective rotor system 36, 44 to vary pitch collectively and tilting of the swash plate assemblies 40, 48 with respect to the axis A will cause the rotor blades 20 to vary pitch cyclically and tilt the rotor disk. The swashplate assemblies 40, 48 translate and/or tilt by a separate servo mechanism 42, 50. The upper rotor pushrods are in the non-rotating reference system while the servos are in the non-rotating reference system which selectively articulates each rotor system 36, 44 independently in both cyclic and collective in response to a rotor control system (illustrated schematically). The rotor control system preferably communicates with a flight control system which receives pilot inputs from controls such as a collective stick, cyclic stick, foot pedals and the like.

It should be understood that the pitch control rods and servo mechanisms 42, 50 for the upper rotor system 16 and a lower rotor system 18 may be located internally or externally to the respective main rotor shaft 14U, 14L and that various pitch control rods, links and servo mechanism at various locations for cyclic and collective pitch control of the rotor system 12 may be utilized with the present invention. Furthermore, it should be understood that rotor control systems other than swashplates will likewise be usable with the present invention.

Figure 4:
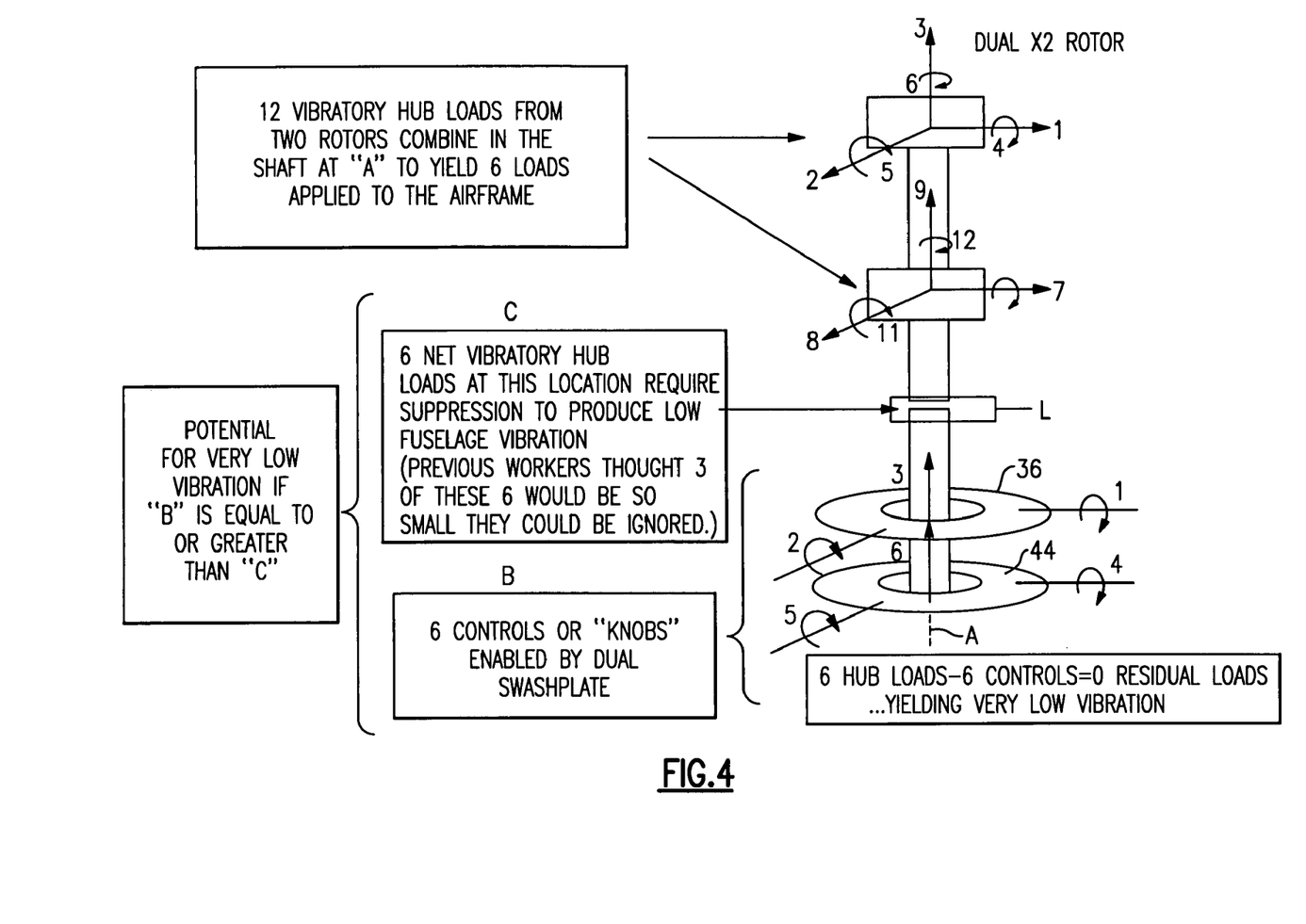
FIG. 4 is a block diagram of the forces moments and control loads available for Higher Harmonic control of a dual, counter-rotating, coaxial rotor system.

Referring to FIG. 4, the rotor system 12 is mounted to the airframe F at a location L and vibrations thereto are transferred at location L. Each rotor system 16, 18 generates six unique vibratory loads. The counter rotating, coaxial rotor system 12 thereby provides twelve vibratory hub loads. The twelve vibratory hub loads combine in the rotor system 12 to yield six loads applied to the airframe F at the location L. The two rotor systems 16, 18 do not produce the same set of three six-force patterns because of the difference in position of the two rotor systems 16, 18, i.e. they have different "leverage" with regard to location L. The six net vibratory hub loads at location L require individual suppression to reduce airframe vibration.

The dual, counter-rotating, coaxial rotor system 12 provides individual control of the upper rotor system 16 and the lower rotor system 18. The lower rotor control system 36 and the upper rotor control system 44 provide a total of six controls or "knobs" to minimize or theoretically eliminate airframe vibration. In a dual, counter-rotating, coaxial rotor system 12, application of HHC to the two rotor systems 16, 18 which are located on the common axis A, will yield essentially complete vibration reduction because the six controls can suppress the six loads.

Figure 5:
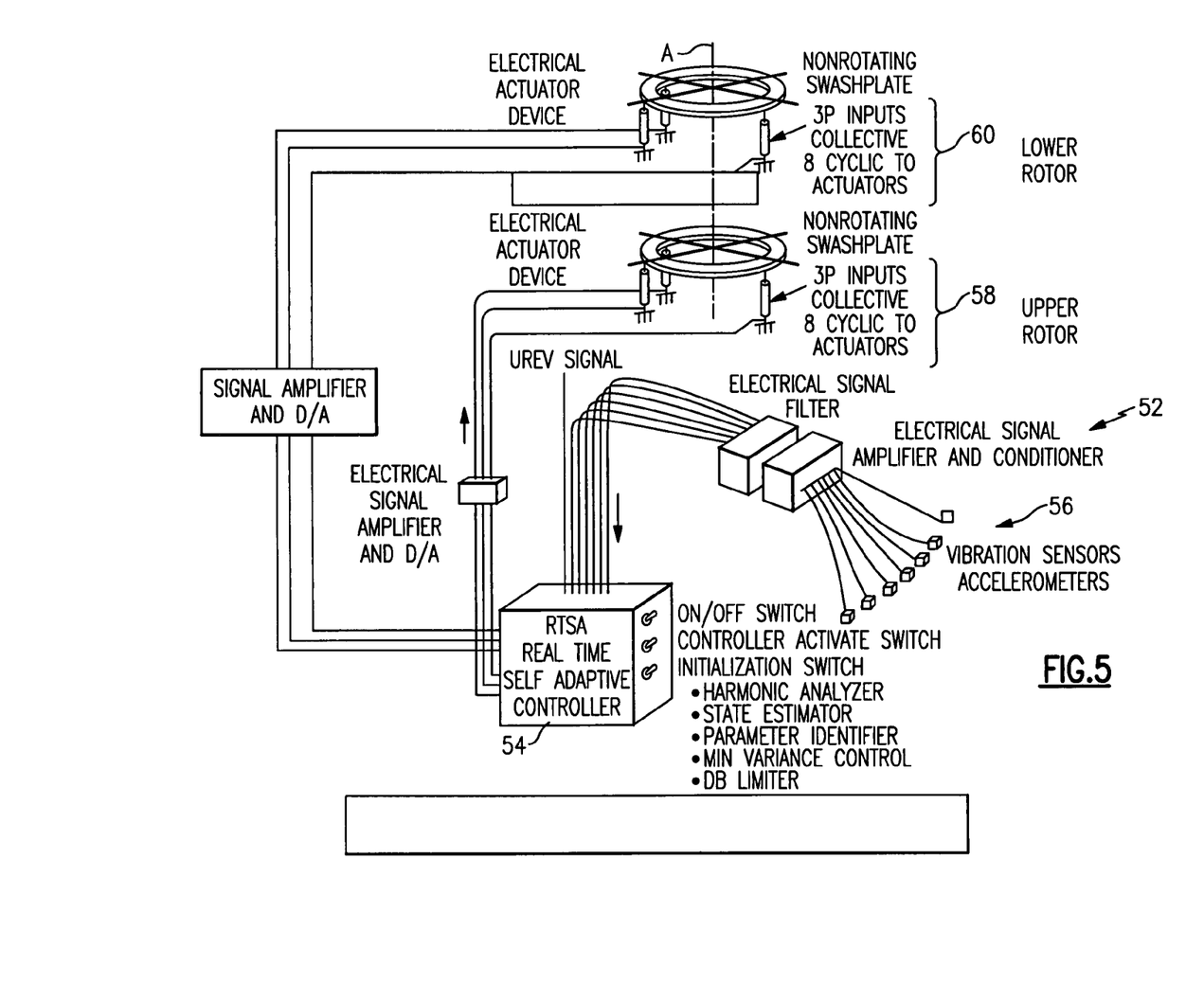
FIG. 5 is a block diagram of a Higher Harmonic control system for a dual, counter-rotating, coaxial rotor system.
Figure 6B:
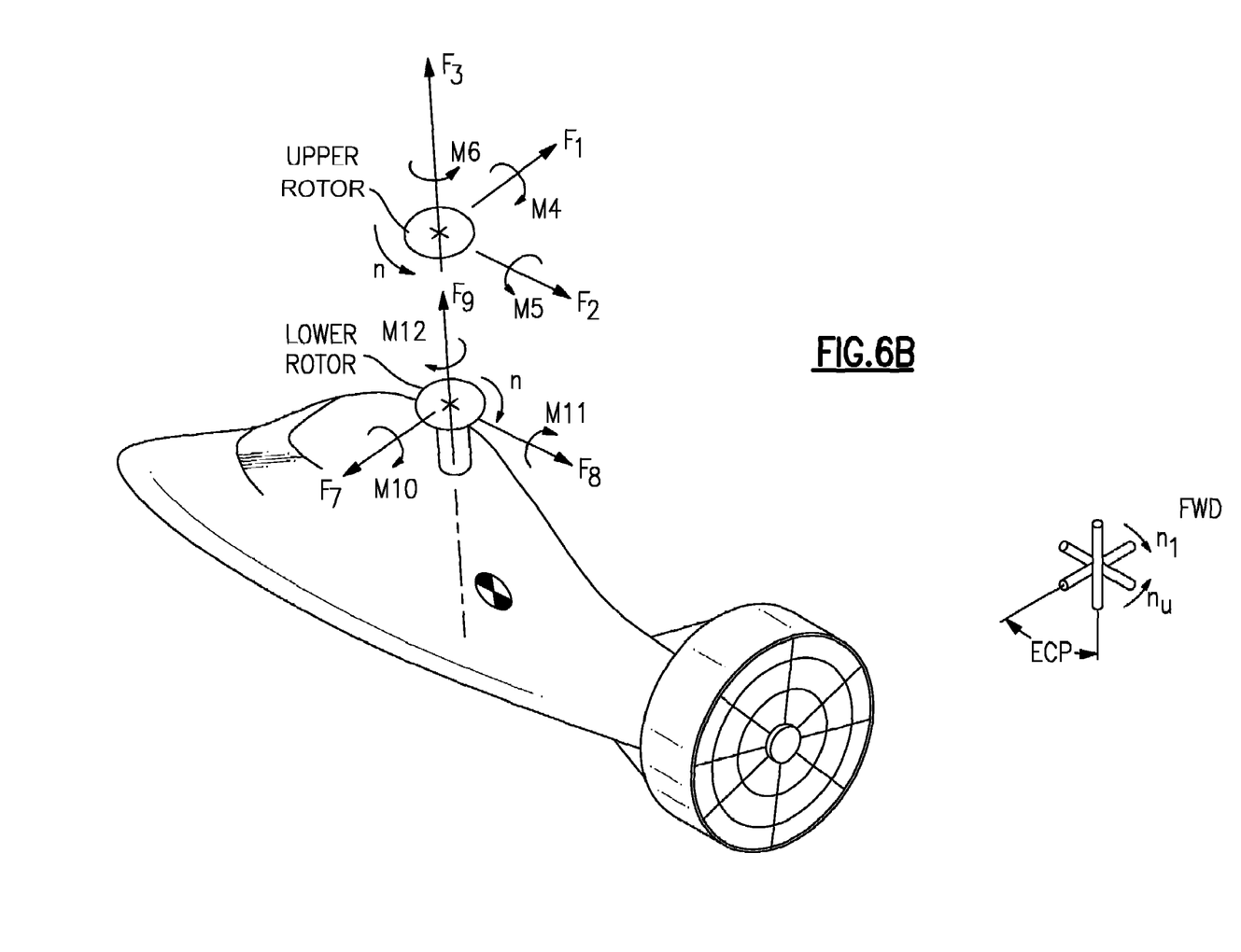
FIG. 6A is a matrix explanation for the Higher Harmonic control system of a dual, counter-rotating, coaxial rotor system having Forces and moments as represented in FIG. 6B.

Referring to FIG. 5, a HHC system 52 generally includes a HHC controller 54, a sensor system 56 in communication with the HHC controller 54, an upper HHC actuator system 58 and a lower HHC actuator system 60 which implements the higher harmonic blade pitch to the upper rotor system 16 and the lower rotor system 18. The HHC controller 54 is in communication with the sensor system 56 to sense vibration within the airframe F. It should be understood that various sensors at various locations may be utilized with the present invention. The HHC controller 54 is preferably an adaptive controller to individually control the upper HHC actuator system 58 and the lower HHC actuator system 60. The HHC controller 54 preferably provides closed loop control of the upper HHC actuator system 58 and the lower HHC actuator system 60 to minimize vibration thereof in accordance with an HHC algorithm (FIGS. 6A and 6B).

The upper HHC actuator system 58 and the lower HHC actuator system 60 preferably each includes a fore-aft cyclic actuator; a left-right cyclic actuator and a collective actuator (x-y-z axes). It should be understood that the upper rotor control system 44 and the lower rotor control system 36 are preferably overlaid or integrated with the pilot inputs with the HHC actuator system 58 and the lower HHC actuator system 60. It should be understood that various actuator systems may be utilized with the present invention so long as active control is provided individually in each axis of both the upper and lower rotor system.

The matrix arithmetic shown in FIG. 6a is a math model that represents how the six HHC controls, U, three from each swashplate, influence the 6 net hub loads F. The square matrix T quantitatively relates the influence of U on F. Well known mathematics indicates that if the matrix T is square, and each column of T is independent, then matrix T can be "inverted" and a control solution, U can be found that will make all elements of F equal to zero. This is a math illustration of why 6 controls or knobs (U) are required to completely nullify 6 hubloads (F). If only three unique values of U existed, it would be impossible to completely nullify F.

It should be understood that relative positional terms such as "forward," "aft," "upper," "lower," "above," "below," and the like are with reference to the normal operational attitude of the aircraft and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotary-wing aircraft comprising:
   a dual, counter-rotating, coaxial rotor system having an upper rotor system and a lower rotor system rotatable about a common axis of rotation;
   an upper swashplate linked to said upper rotor system;
   a lower swashplate linked to said lower rotor system;
   a sensor system within an airframe;
   an upper HHC actuator system which includes at least one individually controllable actuator in each axis to control said upper swashplate and said upper rotor system in an X-Y-Z axis;
   a lower HHC actuator system which includes at least one individually controllable actuator in each axis to control said lower swashplate and said lower rotor system in an X-Y-Z axis; and
   a HHC controller in communication with said sensor system, said upper HHC actuator system, and said lower HHC system to individually control said upper rotor system and said lower rotor system to reduce vibration.

2. The aircraft as recited in claim 1, wherein said HHC controller provides closed loop control of said upper HHC actuator system and said lower HHC actuator system.

3. The aircraft as recited in claim 1, wherein said upper HHC actuator system includes a fore-aft cyclic actuator, a left-right cyclic actuator and a collective actuator to independently control said upper swashplate and said lower HHC actuator system respectively include a fore-aft cyclic actuator, a left-right cyclic actuator and a collective actuator to independently control said lower swashplate.

4. The aircraft as recited in claim 1, wherein said upper rotor system and said lower rotor system each generate six unique vibratory loads such that said counter rotating, coaxial rotor system generates twelve vibratory hub loads, the twelve vibratory hub loads combine in said counter rotating, coaxial rotor system to yield six net vibratory loads applied to said airframe, said HHC controller operable to individually control said at least one individually controllable actuator in each axis to control said upper swashplate and said upper rotor system in said X-Y-Z axis and said at least one individually controllable actuator in each axis to control said lower swashplate and said lower rotor system in said X-Y-Z axis to suppress the six net vibratory loads.

5. The aircraft as recited in claim 4, wherein said HHC controller utilizes matrix arithmetic with a square matrix that quantitatively relates the influence of said at least one individually controllable actuator in each axis of said upper rotor system and said at least one individually controllable actuator in each axis of said lower rotor system on the six unique vibratory loads.

6. The aircraft as recited in claim 5, wherein said HHC controller utilizes an inverse of said square matrix to determine a control solution which controls said at least one individually controllable actuator in each axis of said upper rotor system and said at least one individually controllable actuator in each axis of said lower rotor system.

7. A method of reducing vibration in a rotary wing aircraft airframe having a dual, counter-rotating, coaxial rotor system having an upper rotor system and a lower rotor system rotatable about a common axis of rotation comprising:
   individually controlling at least one individually controllable actuator in each axis to control an upper swashplate and control an upper rotor system in an X-Y-Z axis with an upper HHC actuator system to reduce vibration within an airframe of the aircraft; and
   individually controlling a lower HHC actuator system which includes at least one individually controllable actuator in each axis to control a lower swashplate and control a lower rotor system in an X-Y-Z axis; with a lower HHC actuator system to reduce vibration within the airframe of the aircraft.

8. A method as recited in claim 7, wherein said individually controlling further comprises:
   individually controlling a fore-aft cyclic actuator, a left-right cyclic actuator and a collective actuator of the upper rotor system; and
   individually controlling a fore-aft cyclic actuator, a left-right cyclic actuator and a collective actuator of the lower rotor system independent of the respective fore-aft cyclic actuator, the left-right cyclic actuator and the collective actuator of the upper rotor system.

9. A method as recited in claim 7, wherein said individually controlling further comprises:
   overlaying pilot inputs to the dual, counter-rotating, coaxial rotor system with the HHC actuator system and the lower HHC actuator system inputs to the dual, counter-rotating, coaxial rotor system.

10. A method as recited in claim 7, wherein the upper rotor system and the lower rotor system each generate six unique vibratory loads such that the counter rotating, coaxial rotor system generates twelve vibratory hub loads, the twelve vibratory hub loads combine in the counter rotating, coaxial rotor system to yield six net vibratory loads applied to the airframe; and
   suppressing the six net vibratory loads by individually controlling a fore-aft cyclic actuator, a left-right cyclic actuator and a collective actuator of the upper rotor system and individually controlling a fore-aft cyclic actuator, a left-right cyclic actuator and a collective actuator of the lower rotor system.

* * * * *

UNITED STATES PATENT AND TRADEMARK OFFICE
CERTIFICATE OF CORRECTION

PATENT NO. : 7,648,338 B1  Page 1 of 1
APPLICATION NO. : 11/521032
DATED : January 19, 2010
INVENTOR(S) : William A. Welsh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 617 days.

Signed and Sealed this

Twenty-eighth Day of December, 2010

David J. Kappos
*Director of the United States Patent and Trademark Office*